INVENTOR.
JOSEPH LEDWINKA.
BY John P. Jarbey
ATTORNEY.

Feb. 16, 1932.   J. LEDWINKA   1,844,964
VEHICLE BODY CONSTRUCTION
Filed July 3, 1928   2 Sheets-Sheet 2
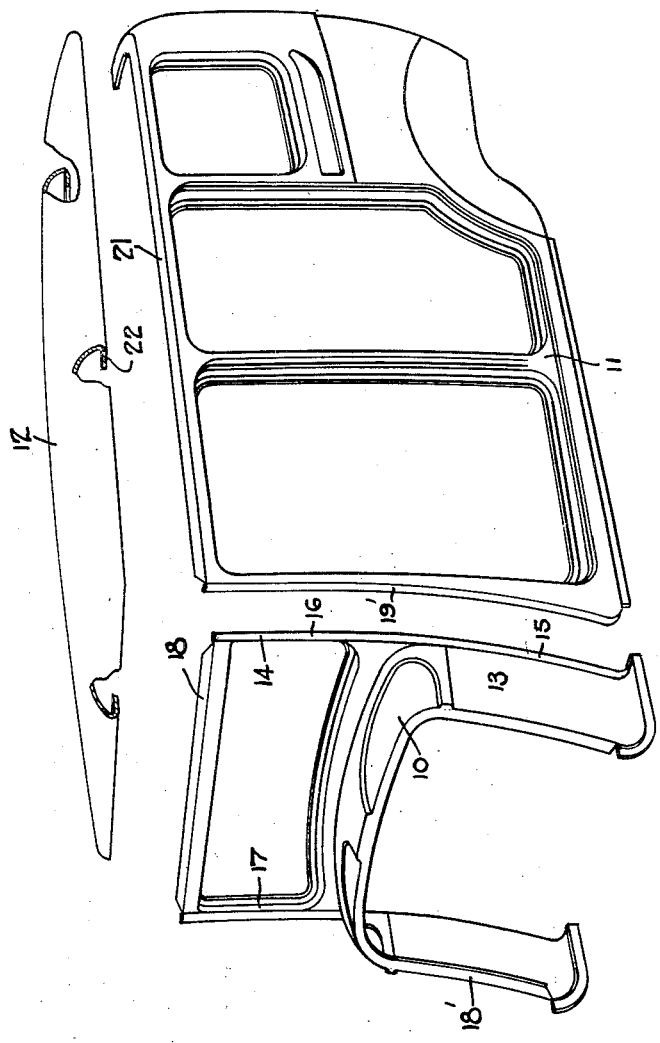
INVENTOR.
JOSEPH LEDWINKA.
BY
*John P. Jarbex*
ATTORNEY.

Patented Feb. 16, 1932

1,844,964

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

VEHICLE BODY CONSTRUCTION

Application filed July 3, 1928. Serial No. 290,126.

The invention relates to vehicle bodies and particularly to such bodies, the walls of which are built up in large part of large sheet metal stampings.

It is a main object of my invention to provide a front unit of this class which includes a cowl and a windshield opening and may be readily made by stamping it out of a single flat sheet of metal and which is so formed at its side edges as to be readily and neatly joined to an adjacent side unit stamping. The invention also resides in the provision of a forward edge portion on the side unit stamping which is of novel form so as to greatly strengthen the side unit at this point and to permit its ready and neat joinder to the front unit above referred to.

In the accompanying drawings I have illustrated a preferred form in which my invention may be embodied. In them, Fig. 1 is a side elevation of an assembled body shell embodying my invention.

Figure 1:
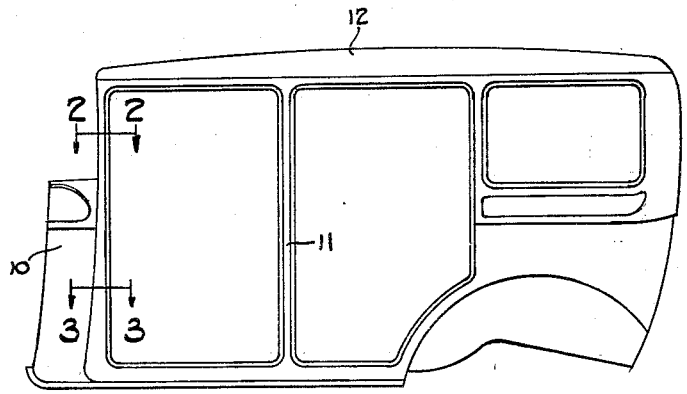
Figure 2:
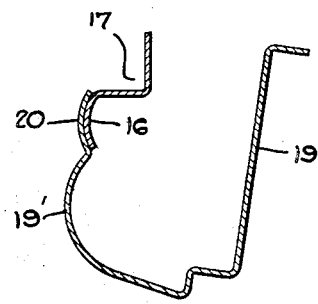
Figure 3:
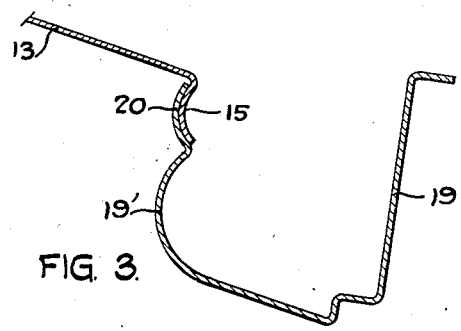

Figs. 2 and 3 are enlarged sectional details taken on the lines 2—2 and 3—3 of Fig. 1 and showing the joint between the front and side units.

Fig. 4 is an exploded view showing front, side and top units as they appear prior to assembly.

The body of my invention is comprised generally of a front unit 10, side units, as 11, a rear unit (not shown) interconnecting the side units and a top unit 12. Each of these units may be comprised of a single unitary sheet metal stamping, so that the major portion of the body may be built up of but five main stampings.

The novel front unit of my invention comprises a cowl 13 and windshield frame 14 which are readily formed of a unitary stamping from a single sheet of metal. To facilitate the formation of the cowl and windshield frame from one stamping the rear edge of the cowl is formed with but a narrow laterally extending flange 15 and the portion of the windshield frame integrally formed with the cowl does not extend laterally beyond the cowl except to the depth of this flange, a flange 16 on the sides of the windshield frame being of a width substantially equal to the flange 15 and in upward continuation thereof. Around the windshield opening the stamping is formed with a rabbet 17 to form a seat to receive the edge of the windshield and the sides of the integral windshield frame are of substantially Z-section, the Z being formed by the flange 16 and the walls of the rabbet 17, as clearly appears in Fig. 2.

At the top the windshield frame may be formed, as shown, with a flange 18 to which the front end of the roof unit is adapted to be joined. The cowl is formed at the front with a stiffening flange 18'.

The forward end of the side unit stamping, as 11, is formed of inwardly presenting channel section to form a front post structure, as clearly appears in Figs. 2 and 3, the rear wall of the channel 19 forming the jamb of the door and the forward wall being rounded, as at 19' to provide a pleasing conformation, and being provided with an inner offset flange 20 outwardly convex in form.

The flanges 15 and 16 are likewise outwardly convex in form and are adapted, in the final assembly of the front and side unit stampings to nest with the flange 20 and be readily secured thereto as by spot welding The convex form also permits the easy removal as by filing of any marks left on the outside surface after the welding operation. The joint just described provides a very neat and strong and easily effected joinder between the front and side units.

The side unit may be provided, at the top as shown, with an inwardly extending flange 21 in the same plane as the flange 18 of the front unit to which the inwardly extending flange 22 extending around the edge of the roof unit may readily be secured in final assembly.

The side unit stamping as shown, is of an extent to include all the door and window openings in the side of the body, but its exact extent other than that it extends around the door opening adjacent the front post is not material to the achievement of the advantages of the present invention.

It is understood, of course, that the various units may be reinforced if deemed necessary by inner panels or braces (not shown) joined to the margins of the stampings and to the margins of the door and window openings.

What I claim is:

1. A front unit for closed vehicle bodies comprising a cowl panel having narrow out-turned flanges at its rear side edges and a windshield seat having its side edges flanged in upward continuation of said panel flanges formed with said cowl panel as a unitary stamping from flat sheet metal panel stock.

2. A front unit for closed vehicle bodies comprising a cowl panel and a windshield seat having side portions of substantially Z-section extending upwardly from the rear edge of the cowl, said side portions terminating in the outer arm of the Z-section and formed as portions of an integral sheet metal stamping with the body of the cowl.

3. In a closed vehicle body, a front unit comprising a cowl panel and a windshield frame of substantially the width of the rear portion of the cowl rising from the rear edge of the cowl, a continuous lateral flange along the rear side edge of the cowl and the windshield frame side, and a side unit comprising a unitary stamping extending around the door opening adjacent the front post and formed along its front edge as an inwardly facing channel post section, the forward wall of said channel transversely overlapping and being joined in final assembly to said lateral flange of the front unit.

4. In a closed vehicle body, a front unit comprising a cowl and the side of a windshield frame rising from the rear side edge of the cowl and in continuation thereof and formed therewith as a unitary stamping, the rear side edge of the cowl and the side of the windshield frame being formed with a continuous lateral flange convex in form, and a side unit comprising a stamping extending around the adjacent door opening and having its forward edge of channel form presenting inwardly of the body, the forward transverse wall of said channel having its edge formed complemental to the convex flange on the front unit, and adapted to nest therewith and be secured thereto in final assembly.

5. A side unit stamping for closed vehicle bodies comprising a unitary inwardly presenting channel section post portion extending from top to bottom of the body in front of a front door opening, said post portion having its rear side wall forming the jamb of the door and the forward wall of less width than the rear wall and formed adjacent its edge with a bead extending from top to bottom of the body and adapted to overlap, throughout its length, a corresponding beaded edge of an outwardly extending correspondingly beaded edge flange of an adjacent unit also extending from top to bottom of the body, whereby to permit a ready and neat joinder of the units in final assembly by spot welding.

In testimony whereof I hereunto affix my signature.

JOSEPH LEDWINKA.